United States Patent
Nieszczur et al.

(10) Patent No.: US 6,206,686 B1
(45) Date of Patent: Mar. 27, 2001

(54) INTEGRAL LOW NOX INJECTION BURNER

(75) Inventors: Keith J. Nieszczur, Seven Hills; Bruce E. Cain, Akron, both of OH (US); John N. Newby, Lexington, KY (US); Thomas F. Robertson, Medina Township; Richard D. Sutton, North Royalton, both of OH (US)

(73) Assignee: North American Manufacturing Company

( * ) Notice: Subject to any disclaimer, the term of this patent is extended or adjusted under 35 U.S.C. 154(b) by 0 days.

(21) Appl. No.: 09/071,270

(22) Filed: May 1, 1998

(51) Int. Cl.$^7$ ........................................................ F23C 5/00
(52) U.S. Cl. ........................ 431/8; 431/10; 431/187
(58) Field of Search ............................. 431/8, 9, 10, 174, 431/181, 187, 188, 284, 285

(56) References Cited

U.S. PATENT DOCUMENTS

| | | |
|---|---|---|
| 2,973,032 * | 2/1961 | Reilly et al. ........................ 431/285 |
| 3,729,285 | 4/1973 | Schwedersky . |
| 3,982,910 * | 9/1976 | Houseman et al. ..................... 431/11 |
| 4,095,929 * | 6/1978 | McCartney ........................... 431/188 |
| 4,347,052 * | 8/1982 | Reed et al. ........................... 431/188 |
| 4,378,205 | 3/1983 | Anderson . |
| 4,496,306 | 1/1985 | Okigami et al. . |
| 4,515,553 | 5/1985 | Morimoto et al. . |
| 4,842,509 * | 6/1989 | Hasenack ............................... 431/9 |
| 4,945,841 | 8/1990 | Nakamachi et al. . |
| 5,154,599 | 10/1992 | Wunning . |
| 5,195,884 | 3/1993 | Scwartz et al. . |
| 5,201,650 | 4/1993 | Johnson . |
| 5,263,849 | 11/1993 | Irwin et al. . |
| 5,308,239 * | 5/1994 | Bazarian et al. ....................... 431/10 |
| 5,486,108 * | 1/1996 | Kubota ................................... 431/8 |
| 5,570,679 | 11/1996 | Wunning . |
| 5,813,846 | 9/1998 | Newby et al. . |
| 5,829,369 * | 11/1998 | Sivy et al. ............................... 431/8 |
| 5,904,475 * | 5/1999 | Ding ....................................... 431/8 |

FOREIGN PATENT DOCUMENTS

| | | |
|---|---|---|
| 44 30 889 A1 | 7/1995 | (DE) . |
| 0291111 A1 | 11/1988 | (EP) . |
| 0592081 A1 | 4/1994 | (EP) . |
| WO 96/37734 | 11/1996 | (WO) . |

* cited by examiner

Primary Examiner—Ira S. Lazarus
Assistant Examiner—David Lee
(74) Attorney, Agent, or Firm—Jones, Day, Reavis & Pogue

(57) ABSTRACT

A low NOx burner and related method are disclosed including the steps of supplying a first reactant stream and introducing a second reactant stream into the first reactant stream at a first point so as to produce co-flowing streams. This resulting fuel/oxidant stream is discharged into a furnace environment having inert combustion products substantially equilibrated to furnace temperature, so as to entrain the combustion products and mix them together with the co-flowing stream. The temperature of the co-flowing stream is increased by the entrained products until it ignites in a combustion region displaced from the first point. Thus ignition cannot occur until the reactant stream has been diluted by inert products of combustion, reducing both oxygen concentration and peak flame temperature, so as to suppress NOx production.

5 Claims, 4 Drawing Sheets

INTEGRAL LOW NOX INJECTION BURNER

BACKGROUND OF THE INVENTION

The present invention pertains to the field of burners, particularly industrial burners of the type used in various high-temperature process applications. It is well established that, in burner systems used in industrial furnaces where two reactants are combusted, (i.e., where a hydrocarbon fuel is combusted with an oxidant) various nitrogen oxide compounds are generated (known collectively as NOx) which has been identified as an environmental pollutant. The reduction of NOx production has become the policy in recent years of various state and federal regulatory agencies. Typical mandates require NOx levels of about 30 ppmv for ambient temperature air. Thus, methods of NOx reduction are of great value.

The factors contributing to NOx production are understood, qualitatively if not quantitatively. In general, it is believed that NOx production is a path-dependent phenomenon resulting from uneven mixing of the fuel and oxidant, which results in sharp temperature gradients, localized peak flame temperatures and elevated oxygen concentrations in the hottest parts of the flame. Various techniques are typically used to reduce these factors. However, such schemes offer various tradeoffs in installed cost and operating efficiency.

A frequently used technique for reducing NOx emissions is external flue gas recirculation (FGR) in which inert combustion products are mixed with the oxidant and/or fuel streams upstream of the burner. This adds a thermal ballast to the system and reduces flame temperatures, thus inhibiting NOx formation. However, FGR systems require additional installation due to larger fans and motors and increased pipe requirements. FGR systems require more energy to operate and are less efficient in the yield of useful heat. Also, FGR components tend to have a short useful life, requiring increased maintenance and/or replacement expenses. During operation, FGR systems tend to be unstable and difficult to control, resulting in increased production expenses due to down time of the system. These difficulties are aggravated as lower NOx levels are attempted, and such systems may become economically unfeasible if further NOx reductions are mandated by the regulatory agencies.

Other burner system designs have been contemplated for complying with NOx production mandates that avoid the problems associated with external FGR. Such systems include air or fuel staged burners in which mixing of fuel and air takes place in multiple stages, allowing heat loss and dilution of reactants with products of combustion between the physically defined stages, thus reducing peak temperatures. However, staged burners are physically large and have complex oxidant and/or fuel passages, increasing installed costs and maintenance requirements.

Another method involves dilute reactant injection in which a furnace is heated to auto-ignition temperature, and fuel and oxidant are injected into the furnace in such a way that each entrain combustion products prior to mixing and combustion. While these systems provide very low NOx levels, additional penetrations to the furnace walls are required compared to conventional burners. This adds to the cost of a new furnace, and makes retrofitting an existing furnace difficult and expensive.

BRIEF DESCRIPTION OF THE INVENTION

In view of the difficulties and drawbacks associated with previous systems, there is therefore a need for a low NOx burner that is simplified in construction.

There is also a need for a low NOx burner with improved efficiency.

There is also a need for a low NOx burner that can be installed to existing furnace penetrations.

There is also a need for a low NOx modification which can be easily installed as an insert to existing burners.

There is also a need for a low NOx burner that permits easy and inexpensive retrofitting to existing furnaces.

These needs and others are satisfied by the low NOx burner and method of the present invention, including the steps of supplying a first reactant stream and introducing a second reactant stream into the first reactant stream at a first point so as to produce co-flowing streams. This resulting fuel/oxidant stream is discharged into a furnace environment having inert combustion products substantially equilibrated to furnace temperature, so as to entrain the combustion products and mix them together with the co-flowing stream. The temperature of the co-flowing stream is increased by the entrained products until it ignites in a combustion region displaced from the first point. Thus ignition cannot occur until the reactant stream has been diluted by inert products of combustion, reducing both oxygen concentration and peak flame temperature, so as to suppress NOx production.

As will be appreciated, the invention is capable of other and different embodiments, and its several details are capable of modification in various respects, all without departing from the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures when the members bear like reference numerals and wherein.

DETAILED DESCRIPTION OF THE INVENTION

Figure 1:
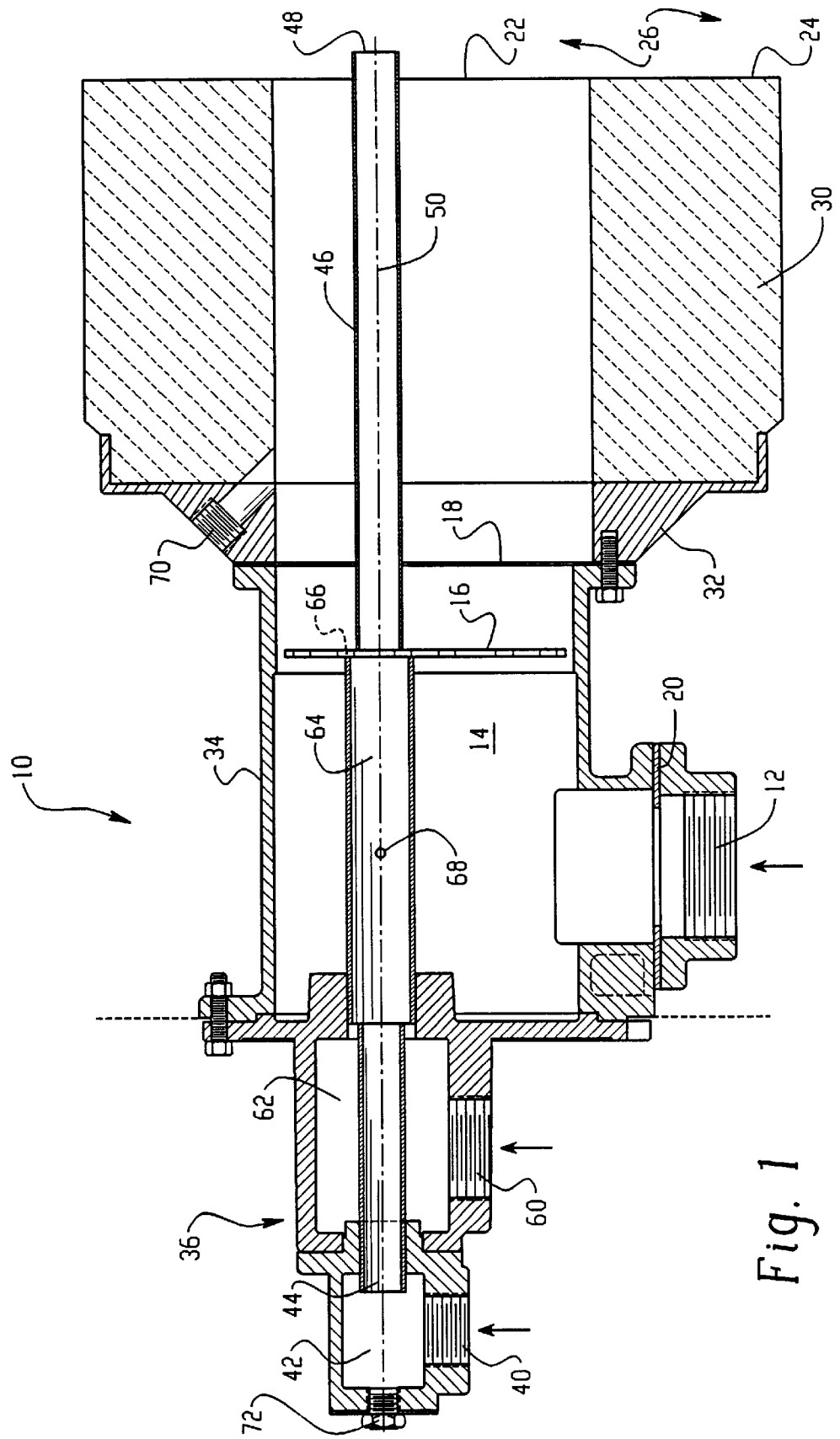
FIG. 1 is a side sectional view showing the present integral low NOx injection burner.

A preferred embodiment of the apparatus 10 of the present invention for firing two reactants, e.g. hydrocarbon fuel and oxidants, is shown in FIG. 1. An oxidant inlet 12 provides an oxidant that can be air, either ambient or preheated by recuperative or regenerative means. The oxidant may also be oxygen-enriched air, pure oxygen, or vitiated with inert gas such as recirculated furnace products. The oxidant is supplied to an oxidant plenum 14 contained within a front housing 34. The oxidant plenum 14 reduces the momentum of the incoming air stream to allow proper distribution of the air across the stabilizer 16. The stabilizer 16 has apertures, (e.g. holes, slots, annulus, etc., or any combination) to ensure an even distribution of oxidant, and in some instances acts as a bluff body to maintain a stable flame when furnace temperature is below the reactant auto-ignition point. The pattern of apertures can be designed to produce any desired heat release pattern for any required application. A choke ring 18 and a baffle 20 may each be optionally used, alone or in combination, to produce the desired modifications in air flow such as is known in the art. The oxidant is flowed through a port 22, and then discharged past the plane of a furnace wall 24 and then into furnace 26.

A back housing 36 preferably includes a primary fuel inlet 40, which supplies fuel, preferably hydrocarbon gas, to a primary fuel plenum 42. The primary fuel plenum 42 supplies primary fuel to one or more primary fuel passages 44, and in turn to a low NOx fuel injector 46, and out through a low NOx fuel injection port 48. The injection port 48 may be located at a first point inside a burner tile 30, flush with the furnace wall 24 or within the furnace volume 26. In any case, the injection port 48 delays ignition of the fuel and oxidant until they have been vitiated by the inert combustion products in the furnace, as will be set forth below in the discussion of the present method. The number, placement and orientation of injector ports 48 can vary, depending on burner type and the characteristics of the desired application. The injector 46 can be offset from the burner axis 50 (as illustrated) and also may optionally have ports inserted axially, radially or at a desired angle between radial and axial, so as to match fuel velocity to a specific oxidant velocity, in magnitude and direction, to produce a particular combustion characteristic. For many applications, a single injector 46 located on the burner axis with a single axial port 48 will achieve the required NOx emissions. Such a design is not mechanically complex, resulting in savings in manufacturing, and great ease and low cost to install.

In the illustrated embodiment, an optional secondary fuel inlet 60 supplies secondary fuel to a secondary fuel plenum 62. The secondary plenum 62 is connected to a secondary passage 64, which delivers fuel to secondary gas ports 66, located at a second point downstream of oxidant plenum 14 but upstream of the low NOx injector ports 48. In this embodiment, the secondary passage, is concentric with the primary passage 44, permitting an annular flow passage for secondary fuel. The secondary passage 64 terminates at the stabilizer 16, which promotes mixing of the secondary fuel and oxidant. Optional premix ports 68 may be used to preliminarily mix fuel and oxidant. The stabilizer 16 may be supported by secondary passage 64, or it may be attached to the front housing.

The present burner 10 may include a burner tile 30 to optionally provide an area of stabilization for the flame envelope during the heat up stage. The tile 30 is made of a material capable of withstanding the heat of combustion (e.g. refractory or metal). The tile 30 defines the port 22 for directing oxidant into the furnace. The tile 30 is mounted to a burner mounting plate 32, typically metal, for permitting attachment of the burner internals. In the illustrated embodiment, the mounting plate 32 is bolted to a front housing 34, which houses the oxidant plenum 14. The back housing 36 is bolted to the back of the front housing 34 for housing other burner internals, as indicated above.

Fuel may be supplied to the secondary fuel elements during furnace heat up for raising furnace temperature, or for maintaining a desired furnace temperature below the auto-ignition point. During operation when furnace temperature is below the level of reactant auto-ignition, an appropriate fraction of the total fuel is supplied respectively through each of the primary and secondary fuel elements. The secondary fuel provides a stable flame for raising furnace temperature, and also may be used to provide a desired flame shape or heat transfer profile suitable for a specific application.

During furnace heat up, the fraction of fuel supplied through the primary injector 46 will be sufficient to cool it, while the fraction of fuel supplied to the secondary ports 66 will be enough to maintain a stable flame in the burner tile. Depending on the process application, reactant composition and emissions requirements, the fraction of secondary fuel may be reduced or eliminated when furnace temperature reaches the reaction auto-ignition point. For applications where the secondary fuel option is not used, alternative methods (such as auxiliary burners) must be used to raise the temperature inside the furnace to the auto-ignition level.

The apparatus may also include a pilot 70 for lighting the burner 10, and an observation port 72 for visually observing the flame, and a flame supervisory port (not shown) for electronically monitoring the flame state and generating a respective signal to a control system.

Figure 2A:
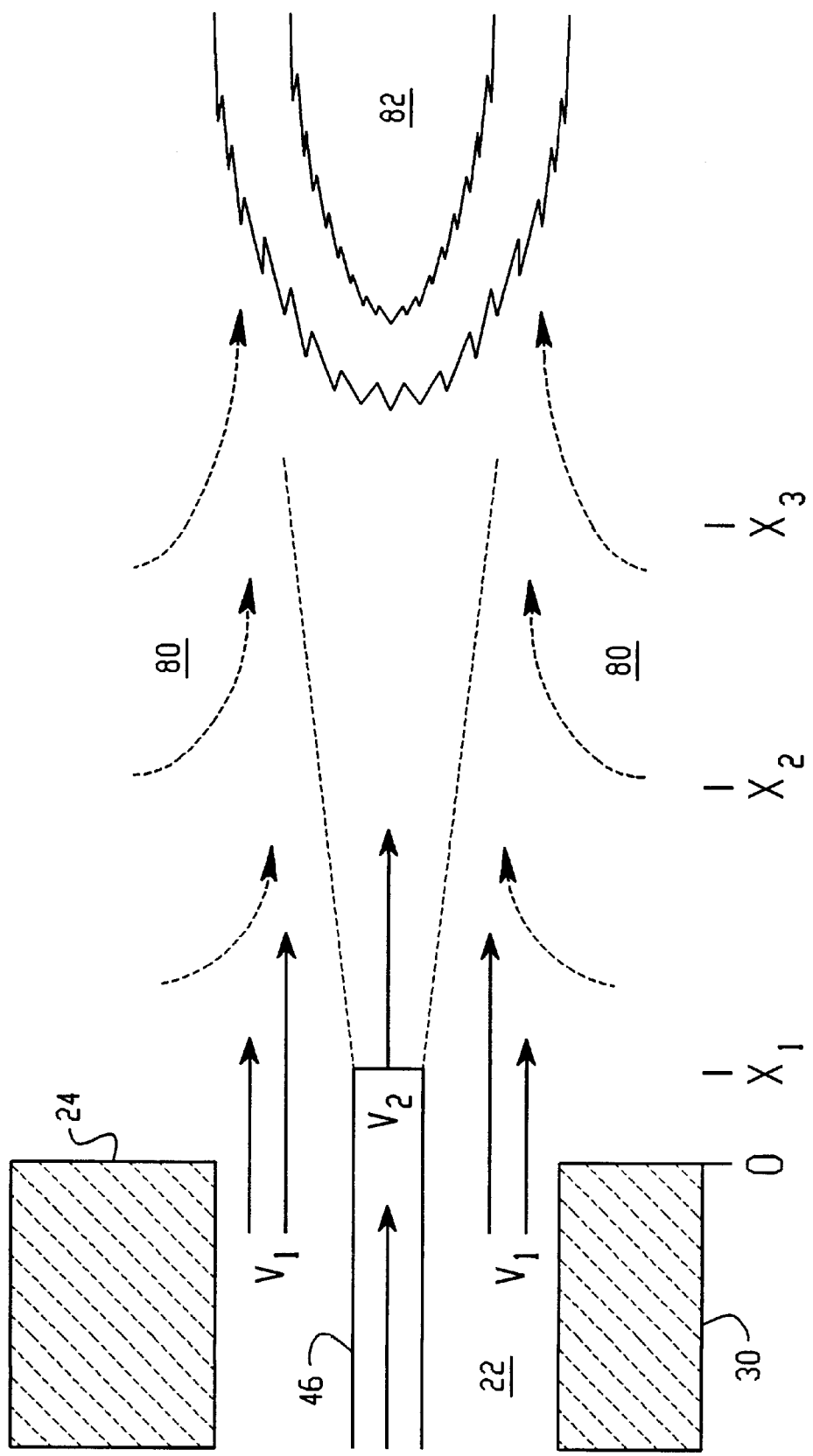
FIGS. 2A, 2B and 2C are diagrammatic views depicting various operational and performance aspects of the present invention.
Figure 2B:
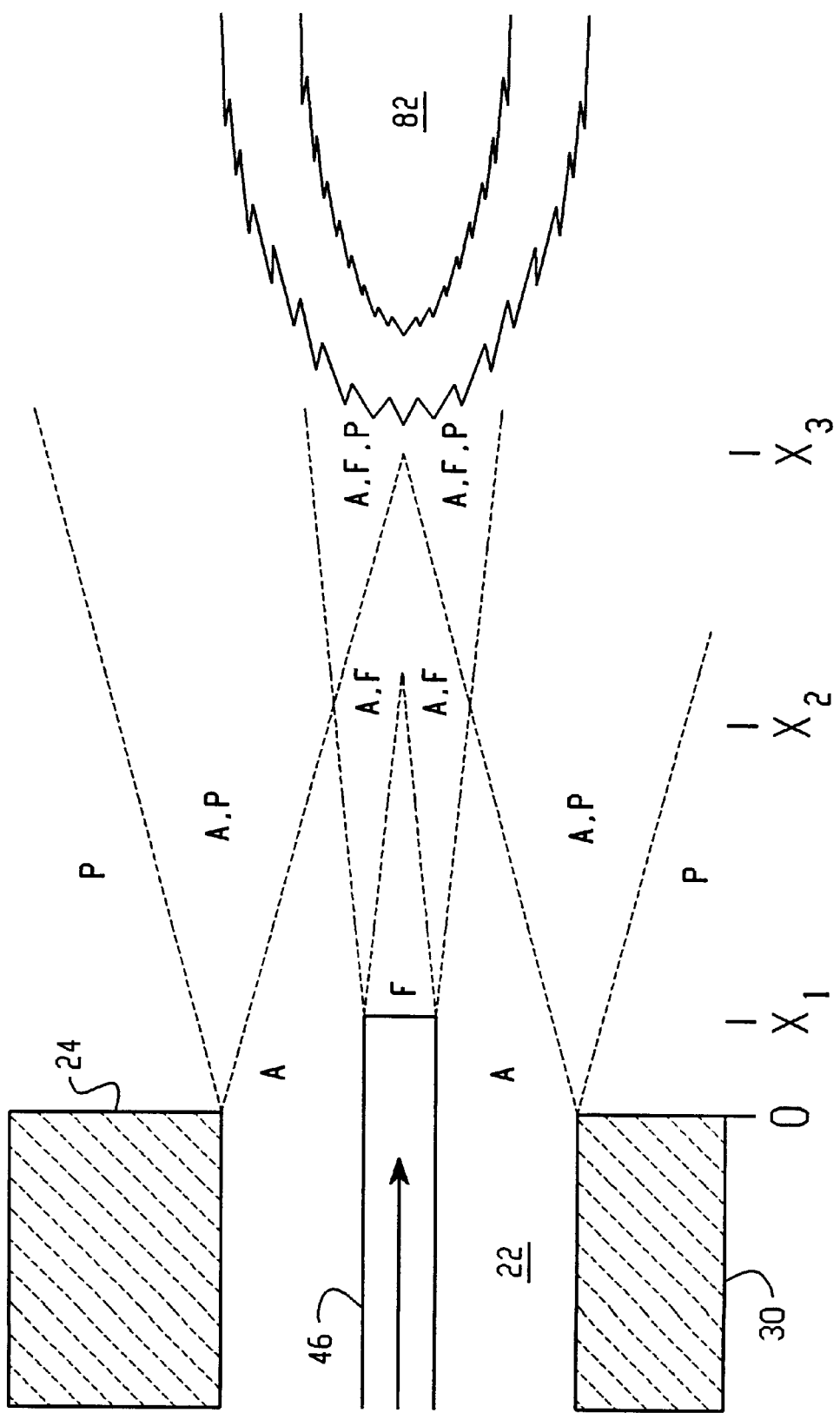
Figure 2C:
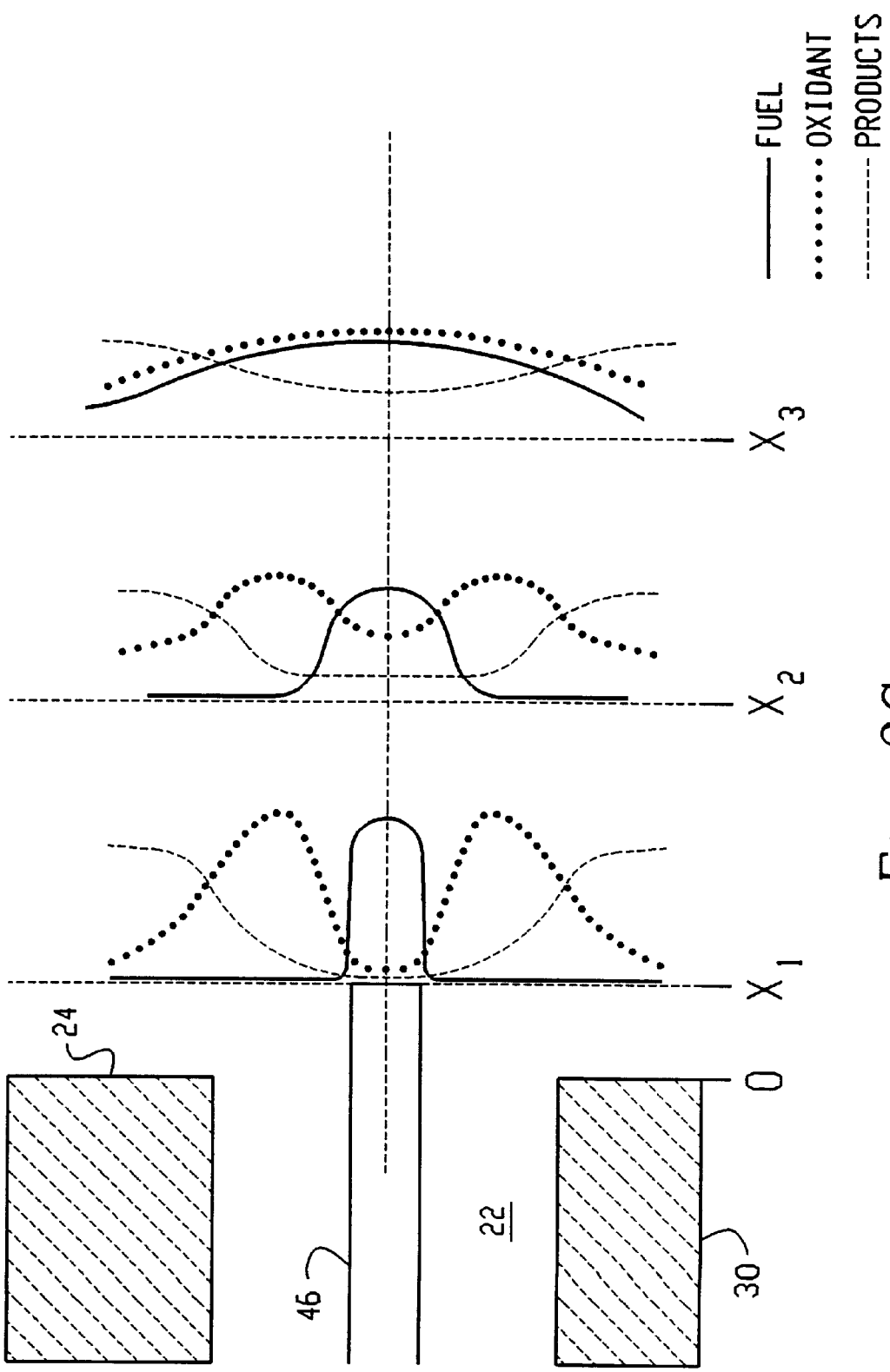

In the method according to the preferred embodiment of the present invention, as shown qualitatively in FIGS. 2A, 2B and 2C, an oxidant stream A is flowed out of the port 22 at a particular velocity $V_1$. A fuel stream F is injected into the oxidant stream out of the low NOx fuel injector 46 at a velocity $V_2$. The co-flowed fuel and oxidant streams are discharged into the furnace 26 which is filled with chemically inert combustion products P that are equilibrated to the operating temperature of the furnace (in the embodiment of FIGS. 2A, 2B and 2C, at least the auto-ignition temperature, about 1400° F.). The fuel and oxidant streams are discharged into the hot furnace environment. Thus, as shown especially in FIG. 2A, the large momentum and temperature differentials between the combustion products P and the co-flowing fuel and air streams result in high entrainment 80 and rapid mixing of the combustion products into the combined stream.

In the illustrated embodiment, as can particularly be seen in FIGS. 2B and 2C, the low NOx fuel injection port 48 is positioned a distance $X_1$ from the plane of the surface of the interior furnace wall, the oxidant port 22 being flush with said wall. The fuel injection port 48 is designed so as to result in an exit fuel velocity $V_2$ appropriately matched to the velocity $V_1$ of the oxidant stream exiting the oxidant port 22. The term "matched" as used herein refers to a defined relationship between $V_1$ and $V_2$ in the unconfined furnace volume that results in a minimum of mixing between the co-flowing fuel and oxidant streams, in contrast to the accelerated mixing typical in prior burners where expanding jets of reacting fuel and oxidant turbulently mix in the confined space of the burner tile. By matching the velocities, the rate of mixing of fuel and oxidant is greatly slowed as compared to previous burners, and mixing is delayed, allowing time for entrainment of the combustion products P to occur.

Thus, a combustible mixture is first produced at a distance $X_2$ from the burner wall 24, where auto-ignition occurs as a "lifted flame" 82. Since by this time a significant quantity of inert combustion products have been mixed into the fuel and oxidant streams, oxygen concentrations are diluted, and the rate of the chemical reaction is slowed. Thus, thermal gradients and peak flame temperatures within the combustion zone are reduced, thereby suppressing NOx formation to extremely low levels. These low NOx levels are achieved even when the fuel is injected into the oxidant stream at a point where it has not yet been diluted by the inert products of combustion in the furnace, as is described below.

In an embodiment where the fuel is natural gas, and the oxidant is air, and where fuel and air are substantially at ambient temperature, and where a uniform heat release rate along the burner axis is desirable, the preferred range for the air velocity ($V_1$) is 80 to 160 fps in the axial forward direction, and the matching fuel velocity ($V_2$) is 60 to 100% of the air velocity ($V_2/V_1$ between 0.6 and 1.0) in the same direction.

In an embodiment using preheated air as oxidant, but otherwise similar to the ambient air embodiment described above, the preferred range of air velocities is 200 to 400 fps, and the matching fuel velocity is 50 to 75% of $V_1$ ($V_2/V_1$ between 0.5 and 0.75) to maintain minimal mixing between air and fuel and excellent mixing of the combined stream with the inert products, resulting in extremely low NOx.

The applicability of the invention is not limited to the velocity ranges described above. Generally, higher air velocities will not be as economical in operating cost, while lower velocities will result in higher NOx emissions than the preferred velocities described above. For retrofit application with ambient air velocities less than 60 fps, $V_2$ should be 2.0 to 3.0 times $V_1$ for optimal NOx emissions.

FIGS. 2B and 2C show particularly the mixing profiles resulting from the present method. $X_1$, $X_2$, and $X_3$ represent displacement in the direction of the burner axis, with the furnace wall (and oxidant port exit) as origin. $X_1$ represents the displacement of the low NOx injector fuel port from the furnace wall. Generally, $X_1$ may be slightly negative (displaced into the oxidant port), zero (coincident with the oxidant port exit), or positive (displaced into the furnace), without changing the mechanism described, and thus without departing from the invention. In FIGS. 2A, 2B, and 2C, $X_1$ is positive; that is, the injector nozzle is displaced into the furnace from the oxidant port exit. Within the oxidant port 46, and immediately beyond the furnace wall 24, up to point $X_1$, the oxidant A, the fuel F, and combustion products P are completely unmixed. The air stream diverges in the pattern of a turbulent jet from the exit of the oxidant port. The momentum and temperature difference between the air stream A exiting the oxidant port 22 and the combustion products P causes rapid entrainment of products P into the air stream to occur along the boundaries of the stream so as to define a region A,P as illustrated in FIG. 2B, where a high level of mixing occurs between the oxidant and combustion products. As the distance from the oxidant port 22 increases, the products P penetrate farther into the core of the flowing air stream.

Another region A,F is defined where fuel and oxidant mixing occurs. Within the boundary of the stream formed by the air exiting the oxidant port 22, the fuel exits the low NOx injector fuel port 46, and creates a fuel flow stream within the flowing air stream, beginning at the exit of the fuel injector at $X_1$. The fuel exit velocity $V_2$ is matched to the oxidant exit velocity $V_1$ so as to minimize the momentum gradient between the co-flowing air and fuel streams, in contrast to the large momentum differential between the flowing streams and the furnace products P noted above. The result is that the products P are mixed into the co-flowing streams A and F more rapidly than the air and fuel streams are mixed together.

Chemical and thermal requirements must be satisfied in order to initiate and sustain a combustion reaction. Mixing of the oxidant and fuel is necessary to satisfy the chemical requirements. In the present invention, mixing is delayed as shown above to allow time for entrainment of furnace products to dilute the combustible mixture. In prior burners, the thermal requirements were satisfied by using mechanical structures to create turbulent eddies within the confined space of a burner tile to recirculate some of the just combusted products back into the just-arriving fuel and oxidant. In the present invention, the predominant mechanism for satisfying the thermal requirements for sustaining combustion is entrainment of furnace products already equilibrated to furnace temperature into the co-flowing streams of fuel and oxidant. Referring to FIG. 2B, it can thus be seen that within the areas labeled "A", "F", and "A,P", the chemical requirements for combustion are not satisfied. In the areas labeled "A", "F", and "A,F", the thermal requirements are not satisfied. Thus, combustion cannot occur in these regions.

$X_2$ is the point where the converging cone formed by entrainment of products into the air "A,P" meets the diverging fuel-air cone "A,F" resulting from the slowly mixing air and fuel; this new region is shown as "A,F,P". This region is a flame base where partial combustion can begin to occur. At $X_3$, sufficient entrained products P have penetrated to the center of the stream, and mixing of fuel and air has progressed so that the fuel, air and entrained products provide the chemical and thermal requirements to continuously sustain a dilute low NOx combustion reaction. In an embodiment that uses pre-heated air, the thermal requirements may be partially or completely satisfied by air itself. In such a case, measures can be taken to delay establishment of the chemical requirements. One such measure is displacement of the fuel nozzle exit ($X_1$) downstream from the oxidant nozzle. Another such measure is to displace the fuel nozzle so that it is off-axis, or to orient it so that the direction of the fuel velocity is inclined with respect to the axis of the oxidant port.

The embodiment of FIG. 1 shows the injector axis 50 displaced from the central axis of the oxidant port 22. When the two axes are collinear (as in FIGS. 2A, 2B, and 2C), the radial distance between the fuel exiting the port 48 and the combustion products P is greatest. However, it may be desirable for certain applications to use an off-axis injector 46 so as to place the fuel F closer to the combustion products P, which are the source of dilution. In such an alternate embodiment, the diverging fuel cone shown in FIG. 2B would be displaced toward the oxidant port 22 perimeter, thus displacing the regions A,F; A,P; and A,F,P. This can also be effected by using more than one injector 46.

An example of a system to provide excellent combustion characteristics and extremely low NOx emissions for many applications requiring ambient air as oxidant and natural gas as fuel would use a single fuel injector per oxidant port, with the fuel injector located concentric to the air port. The air discharge would be sized for a velocity of 150 fps ($V_1$), and the fuel discharge would be sized for 125 to 150 fps fuel velocity ($V_2$). The fuel nozzle exit would be displaced downstream of the air nozzle exit by 0 to 0.5 times the oxidant port diameter.

For a typical application using air preheated from 400 to 900 F., the air discharge would be sized for a velocity of 350 fps, and the fuel discharge would be sized for 225 to 250 fps.

The velocities described above will provide combustion characteristics suitable for many applications, will result in extremely low NOx emissions, and are within practical capabilities of existing equipment (combustion air blowers, fuel piping, etc.) installed in many applications to supply. However, the invention is not limited to the velocities and configurations described. The invention is capable of reducing NOx by 50% or more compared to prior burners sized for the same supply conditions of air and fuel in retrofit applications where the oxidant velocity at the maximum firing rate can range from 40 to 500 fps, and where the oxidant velocity can include or not include a rotational component (swirl), by matching the fuel velocities as described.

In the present invention, the flame is "non-anchored" in contrast with previous systems which use specific flow structures that create eddies and currents within the reactant streams for mixing the fuel and oxidant with each other and with the combustion products. No mechanical structures are provided at present for ensuring the fluidic stability of the flame. However, the flame has considerable thermal stability, and a consistent flame with high temperature uniformity results from the present method and apparatus. The flame is supervisable by detection of furnace temperature above the auto-ignition point, or by detection of UV radiation by equipment used for the same purpose in conventional burners. By eliminating the complex flow structures of previous systems, the present invention is mechanically simple in construction and thus inexpensive to manufacture.

The present invention is easy to retrofit to existing burners. In some instances, retrofitting can be as simple as attaching a package including a back housing 36 with attached injector 46 and related structures to an existing front housing 34. This can result in savings as much as 60–70% over comparable competing retrofits. Such savings would be welcome by users with many burners who are required to retrofit to comply with regulatory mandates. Since the present burner can be installed to existing furnaces without making additional penetrations or other modifications to the furnace enclosure, the present invention can be installed quickly with a minimum of lost production time, resulting in further savings.

As described hereinabove, the present invention provides a system with improved performance and efficiency over previous devices. However, it will be appreciated that various changes in the details, materials and arrangements of parts which have been herein described and illustrated in order to explain the nature of the invention may be made by those skilled in the art within the principle and scope of the invention as expressed in the appended claims.

We claim:

1. A combustion method for providing low NOx emissions from a furnace, said combustion method comprising the steps of:

providing a furnace environment including inert combustion products substantially equilibrated to a furnace operating temperature;

supplying a first reactant stream comprising an oxidant;

injecting a second reactant stream comprising a fuel within said first reactant stream so as to produce a co-flowing reactant stream;

introducing said co-flowing reactant stream into said furnace environment at an entry point, said introducing step causing said inert combustion products to become entrained into said co-flowing reactant stream and thereby causing auto-ignition of said co-flowing reactant stream to occur as a result of a temperature increase induced by entrainment of said inert combustion products into said co-flowing reactant stream; and suppressing NOx production by diluting said co-flowing reactant stream with said inert combustion products prior to said auto-ignition of said co-flowing reactant stream;

said suppressing step comprising controlling the velocities of said first and second reactant streams with reference to each other so that intermixing of said oxidant and said fuel, and corresponding susceptibility to auto-ignition thereof, is suppressed to allow time for said co-flowing reactant stream to move into said furnace environment to an auto-ignition point spaced substantially from said entry point before igniting.

2. A combustion method as defined in claim 1 wherein said suppressing step maintains said velocity of said second reactant stream less than or equal to said velocity of said first reactant stream.

3. A combustion method as defined in claim 2 wherein said oxidant comprises ambient air, said velocity of said first reactant stream is maintained within the range of 60 to 180 fps, and said velocity of said second reactant stream is maintained within the range of 60 to 100 percent of said velocity of said first reactant stream.

4. A combustion method for providing low NOx emissions from a furnace, said combustion method comprising the steps of:

providing a furnace environment including inert combustion products substantially equilibrated to a furnace operating temperature;

supplying a first reactant stream comprising, an oxidant;

injecting a second reactant stream comprising a fuel within said first reactant stream so as to produce a co-flowing reactant stream;

introducing said co-flowing reactant stream into said furnace environment at an entry point, said introducing step causing said inert combustion products to become entrained into said co-flowing reactant stream and thereby causing auto-ignition of said co-flowing reactant stream to occur as a result of a temperature increase induced by entrainment of said inert combustion products into said co-flowing reactant stream; and suppressing NOx production by diluting said co-flowing reactant stream with said inert combustion products prior to said auto-ignition of said co-flowing reactant stream;

said suppressing step comprising controlling the velocities of said first and second reactant streams with reference to each other so that intermixing of said oxidant and said fuel, and corresponding susceptibility to auto-ignition thereof, is suppressed to allow time for said co-flowing reactant stream to move into said furnace environment to an auto-ignition point spaced substantially from said entry point before igniting;

said suppressing step maintaining said velocity of said second reactant stream less than or equal to said velocity of said first reactant stream;

said oxidant comprising preheated air having a temperature above ambient up to 1,000° F., said velocity of said first reactant stream being maintained within the range of 200 to 400 fps, and said velocity of said second reactant stream being maintained within the range of 50 to 75 percent of said velocity of said first reactant stream.

5. A combustion method for providing low NOx emissions from a furnace, said combustion method comprising the steps of:

providing a furnace environment including inert combustion products substantially equilibrated to a furnace operating temperature;

supplying a first reactant stream comprising an oxidant;

injecting a second reactant stream comprising a fuel within said first reactant stream so as to produce a co-flowing reactant stream;

introducing said co-flowing reactant stream into said furnace environment at an entry point, said introducing step causing said inert combustion products to become entrained into said co-flowing reactant stream and thereby causing auto-ignition of said co-flowing reactant stream to occur as a result of a temperature increase induced by entrainment of said inert combustion products into said co-flowing reactant stream;

suppressing NOx production by diluting said co-flowing reactant stream with said inert combustion products prior to said auto-ignition of said co-flowing reactant stream;

said suppressing step comprising controlling the velocities of said first and second reactant streams with reference to each other so that intermixing of said oxidant and said fuel, and corresponding susceptibility to auto-ignition thereof, is suppressed to allow time for said co-flowing reactant stream to move into said furnace environment to an auto-ignition point spaced substantially from said entry point before igniting; and injecting a third reactant stream comprising a fuel within said first reactant stream at a point upstream of said co-flowing reactant stream.

* * * * *